United States Patent [19]
Helgeland

[11] 3,832,642
[45] Aug. 27, 1974

[54] CURRENT MEASURING CIRCUIT AND METHOD

[75] Inventor: Walter Helgeland, Lexington, Mass.

[73] Assignee: Varian Associates, Palo Alto, Calif.

[22] Filed: Nov. 29, 1972

[21] Appl. No.: 310,471

[52] U.S. Cl. .................. 330/2, 324/123 C, 330/9, 330/85, 330/97, 330/103, 330/110
[51] Int. Cl. ............................................. H03f 1/36
[58] Field of Search ............... 330/2, 9, 85, 97, 103, 330/110; 324/123 R, 123 C, 130

[56] References Cited
UNITED STATES PATENTS

| | | | |
|---|---|---|---|
| 3,131,349 | 4/1964 | Cary et al. | 324/123 R X |
| 3,321,628 | 5/1967 | Webb | 324/123 R X |
| 3,390,302 | 6/1968 | Strathman et al. | 324/130 X |

*Primary Examiner*—Herman Karl Saalbach
*Assistant Examiner*—James B. Mullins
*Attorney, Agent, or Firm*—Stanley L. Cole; Leon F. Herbert; John J. Morrissey

[57] ABSTRACT

The current of a mass spectrometer collector is indicated by a circuit including an electrometer tube having a control grid connected to the collector. The electrometer tube is included in a d.c. amplifier having a negative feedback path including a very high valued resistor directly connected to the control electrode so that the collector current develops a sufficient voltage to be amplified to a detectable level by the amplifier. Automatic zero and reset control for the amplifier is provided by another d.c. negative feedback loop responsive to the amplifier output. The another negative feedback loop includes an operational amplifier integrator having an output connected to a screen grid of the electrometer tube. The operational amplifier integrator is selectively connected to the d.c. amplifier output so that when the mass spectrometer responds to a sample the integrator is not responsive to the d.c. amplifier output and the spectrometer current is indicated by a d.c. meter connected to the amplifier output via a variable gain operational amplifier.

10 Claims, 3 Drawing Figures

3,832,642

CURRENT MEASURING CIRCUIT AND METHOD

FIELD OF INVENTION

The present invention relates generally to circuits for indicating mass spectrometer collector leak currents and more particularly to a circuit wherein there is provided automatic zero and reset control for an amplifier driving a mass spectrometer current indicator.

BACKGROUND OF THE INVENTION

Figure 1:
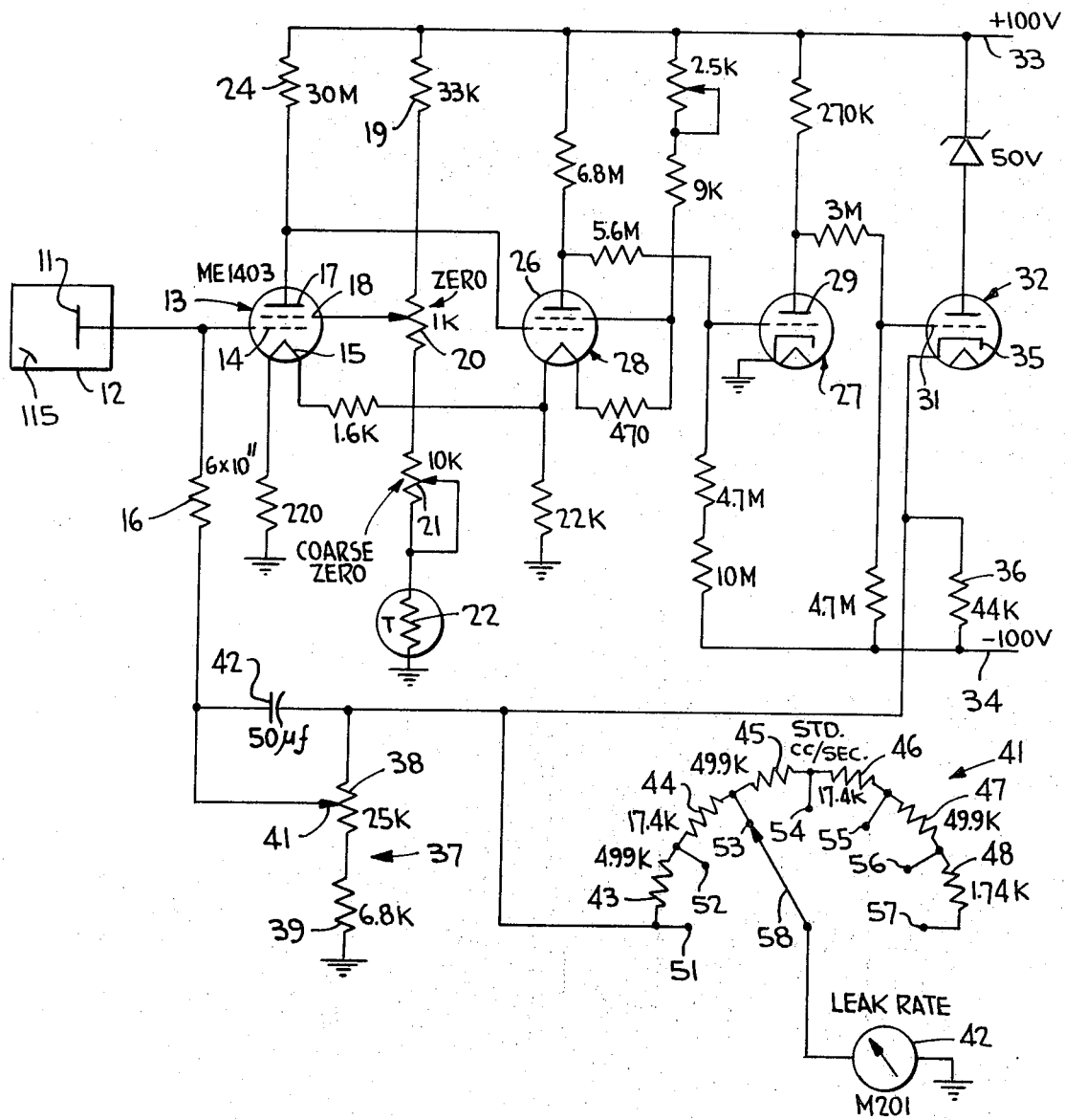
FIG. 1 is a circuit diagram of a prior art circuit for indicating mass spectrometer collector current wherein neither automatic zero nor resetting is provided.

Referrnce is now made to FIG. 1 of the drawing wherein there is illustrated a prior art circuit which has been extensively employed for helium mass spectrometer leak detection, as indicated by monitoring the d.c. current derived from collector 11 of mass spectrometer tube 12, which is illustrated in highly schematic form. Helium leak current is the helium ion current at collector 11 which is derived in response to ions leaking into spectrometer 12 from a helium source that may surround a test piece in fluid flow relationship with the spectrometer. Basically, the circuit comprises an electrometer amplifier tube 13 having a control grid 14 connected in d.c. circuit with collector electrode 11. The impedance of tube 13 between its control grid 14 and cathode 15 is sufficiently high, approximately on the order of magnitude of the very high impedance between collector electrode 11 and the spectrometer cathode 115, to prevent loading of the collector electrode current. Typically, the current derived from collector electrode 11 ranges from approximately $10^{-15}$ to approximately $10^{-12}$ amps with a biasing potential of approximately 200 volts between collector 11 and cathode 115 of the spectrometer tube. One electrometer tube that has the required impedance between its control grid and cathode is the Mullard M. E. 1403. To enable the minute current derived from the collector 11 to be transformed into a voltage of sufficient level to be amplified to a detectable level, very high valued resistor 16 is connected as a feedback resistor to collector 11 and control grid 14. A typical value of resistor 16 is $6 \times 10^{11}$ ohms.

In response to the d.c. voltage developed across resistor 16, there is derived at the anode 17 of tube 13 an amplified replica of the collector current of spectrometer 12. Control for the d.c. level of the voltage at anode 17 is provided by a biasing circuit for screen grid 18 of tetrode tube 13. The biasing circuit includes a voltage divider comprising fixed resistor 19, potentiometer 20, variable resistance 21 and temperature responsive resistance 22. The magnitude of resistor 21 and the position of slider 23 of potentiometer 20 are controlled by an operator to respectively provide coarse and fine zero control for the bias of screen grid 18, whereby in response to a steady state current at collector electrode 11 a zero indication is provided by the circuit of FIG. 1. As drift of the spectrometer collector current or the amplifier components occurs, the operator adjusts the fine, and if necessary, the coarse zero controls so that a zero indication is derived for steady state operation of the electrometer. Temperature responsive resistor 22 provides temperature compensation so that the zero indication is provided over a wide temperature range.

The indication of leak current derived from collector 11 is provided by a d.c. amplifier responsive to the voltage developed across anode load resistor 24. The d.c. amplifier includes a pair of cascaded stages comprising tetrode 26 and triode 27, whereby control grid 28 of tetrode 26 is connected in d.c. circuit to anode 17 of electrometer tube 13. D. C. voltage developed at anode 29 of triode 27 is coupled to grid 31 of cathode follower 32, the anode cathode path of which is biased by positive and negative d.c. power supply voltages on leads 33 and 34. The cathode circuits of tubes 13, 27, and 28 are referenced to ground, either directly or through cathode biasing resistors.

Negative feedback from cathode 35 of triode 32 for the voltage developed across cathode load resistor 36 is provided by a d.c. path including gain control, variable impedance network 37, which is connected in series with the large valued resistor 16. Gain control circuit 37 comprises the series combination of potentiometer 38 and resistor 39 which is connected in shunt between cathode 35 and ground. Potentiometer 38 includes a tap 41 which is connected to one electrode of noise filtering capacitor 42, having a second electrode connected to cathode 35. The gain of the amplifier is controlled by the position of slider 41 so that in response to the slider being connected to the common point between the potentiometer 38 and resistor 39, the amplifier gain is a maximum.

After the gain and zero controls have been established, the voltage developed at cathode 35 provides an indication of the signal current derived from spectrometer tube collector 11. The voltage of cathode 35 is measured by a circuit including variable resistor 41 and d.c. microammeter 42, having a full scale deflection of 20 microamperes and an internal impedance of 2.5 kilohms. Variable resistor 41 comprises six series connected resistors 43–48 which are connected to taps 51–57, one of which is selectively connected to contactor 58. Resistors 43–48 are selected so that a twenty microamp full scale reading can be derived from seven different leak current ranges.

In typical steady state operation, spectrometer tube 12 responds solely to the trace gases maintained therein. When it is desired to analyze a sample, the sample is introduced into the spectrometer tube with a carrier and a significant increase in the current derived from the spectrometer tube 11 is derived for approximately three seconds. Thereafter, the spectrometer tube collector current returns to a relatively low value until a further sample is inserted. The spectrometer tube collector current under steady state conditions has a tendency to vary, i.e., drift, due to changes in the steady state background pressure of trace, helium gas in the spectrometer tube, as do the characteristics of the electronic components included in the electrometer tube 13 and the d.c. amplifier. The circuit of FIG. 1 responds to this drift, which appears as a signal to it, and erroneous leak current indications can thereby be derived from meter 42. To correct for drift and provide zero adjustment, the value of resistor 21 and the position of slider 23 are adjusted until a zero reading is provided by meter 42.

Figure 2:
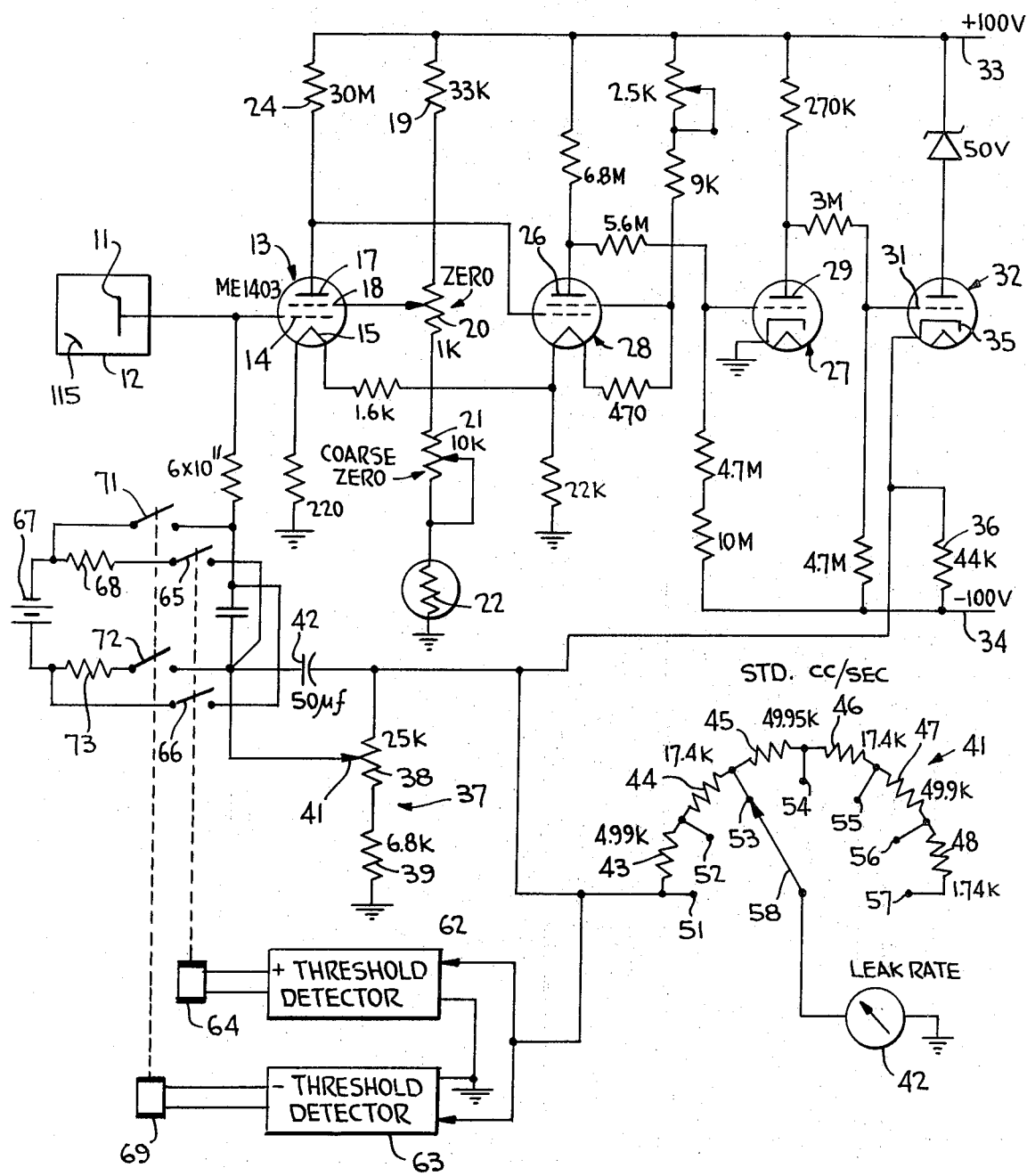
FIG. 2 is a circuit diagram of a further circuit for indicating mass spectrometer collector current wherein reset control is automatically provided.

To provide for automatic zero and drift control, via a resetting action, the circuit of FIG. 2 was developed. The FIG. 2 circuit differs from the FIG. 1 circuit by the inclusion of capacitor 61 in series with the large valued resistor 16 and potentiometer slider 41. Capacitor 61 is charged by positive and negative currents at different rates in response to the polarity of the voltage supplied by cathode 35 to the indicator circuit including variable resistor 41 and micro ammeter 42.

To this end, positive and negative threshold detectors 62 and 63 are connected to be responsive to the voltage at cathode 35; the positive and negative threshold detectors are respectively triggered into a conducting state in response to the cathode voltage exceeding positive and negative threshold limits relative to ground. In response to the positive and negative threshold detectors being activated, capacitor 61 is respectively charged with a negative current at a relatively high rate and a positive current at a relatively slow rate. The positive threshold detector 62 is connected to actuate relay 64 having contacts 65 and 66 which connect floating d.c. power supply 67 in series with capacitor 61 via resistor 68, which has a relatively low value to provide a relatively fast charging rate for negative current flowing from the power supply to the capacitor. In response to negative threshold detector 63 deriving an output signal in response to the magnitude of the voltage on cathode 35 exceeding a predetermined negative level, relay 69 is activated to close contacts 71 and 72 so capacitor 61 is charged at a very slow rate by a positive current derived from power supply 67 via resistor 73. The value of resistor 73 is selected to provide an extremely long time constant, on the order of seven hours, for capacitor 61.

The circuit is designed to operate so that capacitor 61 provides automatic reset for the transient variations of leak current derived from spectrometer tube collector 11 when a sample is being analyzed. Threshold detectors 62 and 63 cause capacitor 61 to be charged and discharged with opposite polarity currents in such a way as to tend to reduce the voltage at cathode 35 to zero. In response to the voltage at cathode 35 being reduced to approximately zero, the activated relay 64 or 69 is deenergized, causing its contacts to open so capacitor 61 is not additionally charged. The previously established charge is maintained on the capacitor, which is of an extremely high quality, to provide the automatic zero and reset action.

A problem that has been encountered with the circuit of FIG. 2 is that a negative transient in the power supply voltage of the circuit, as occurs in response to a severe voltage change of an a.c. power source for the d.c. power supply of the circuit, or a severe change in the load of the a.c. source or d.c. power supply causes a long term imbalance of the circuit. The long term imbalance occurs because the negative transient is reflected as a positive voltage at cathode 35, causing capacitor 61 to be charged at a relatively fast rate in a negative direction. When the transient subsides, however, the negative charge on capacitor 61 causes a positive voltage to be derived at cathode 35 which results in energization of negative threshold detector 63. Therefore, because of the long time constant of the charging circuit for capacitor 61 through resistor 73, the negative charge on capacitor 61 requires an extremely long time to be dissipated. In certain instances, it is not possible to dissipate the charge on capacitor 61 due to a transient prior to an additional transient occurring.

A further problem of the circuit of FIG. 2 is that the extremely high impedance of resistor 73 for charging capacitor 61 causes leads connected between the capacitor and the charging source to function as a noise source. The noise is coupled through the electrometer tube and the amplifier to the indicator and is indistinguishable on a reading of d.c. microammeter 42 from leak currents derived from the spectrometer tube collector.

It is, accordingly, an object of the present invention to provide a new and improved circuit for indicating currents derived from a mass spectrometer collector.

Another object of the present invention is to provide a circuit for providing automatic reset and zero correction for an electrometer amplifier.

An additional object of the invention is to provide a circuit for indicating currents of a mass spectrometer collector, with provision for reset with equal facility in response to variations of either polarity.

A further object of the invention is to provide a new and improved method of operating a circuit for indicating collector current of a mass spectrometer to provide for automatic drift and zero control while the mass spectrometer is in a steady state condition and for providing an indication of mass spectrometer current while it is responding to a measured sample.

BRIEF DESCRIPTION OF THE INVENTION

In accordance with the present invention, drift and zero correction are automatically provided by including an operational amplifier integrator that is connected, while the spectrometer is in steady state operation, in a negative feedback loop responsive to the electrometer tube output, as coupled through the d.c. amplifier. The output of the integrator provides proportional and integral, i.e., reset, control to respectively provide for the zero and drift control. When a sample is introduced into the mass spectrometer tube, a switch is activated to disconnect the operational amplifier input from the output of the d.c. operational amplifier. A capacitor of the integrator remains charged to the same value as was provided during steady state spectrometer operation until the switch is closed after the transient current response from the sample has subsided. Thereby, during the transient period, there is no change in the voltage fed to the integrator and the proportional and reset controls are maintained at the steady state condition, without being affected by the transient condition. The transient current, indicative of the sample, is measured by a relatively inexpensive milliammeter that is connected to the output circuit of an operational amplifier which feeds the integrator.

Figure 3:
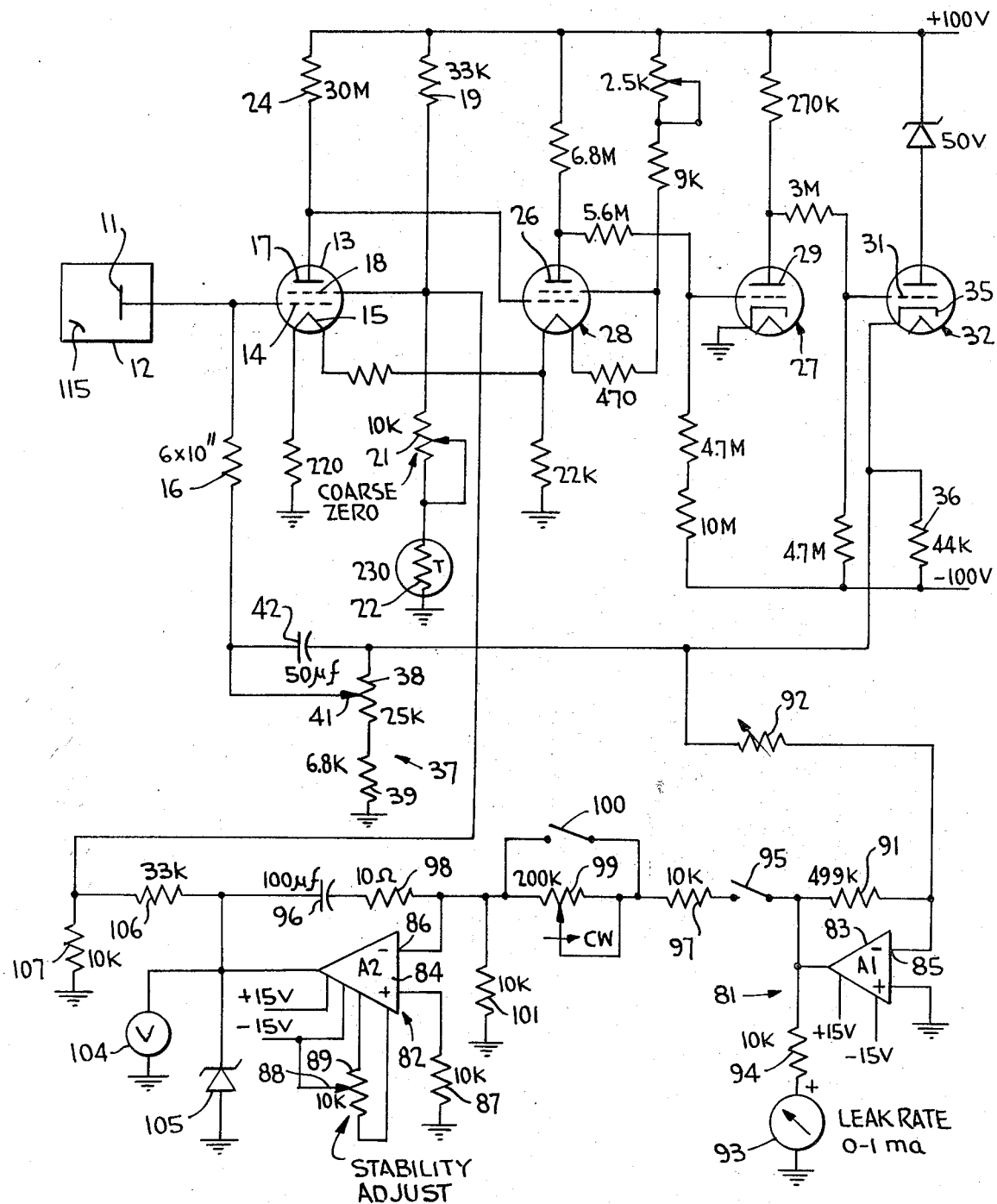
FIG. 3 is a circuit diagram of a mass spectrometer collector current indicating circuit in accordance with the present invention.

The above and still further objects, features and advantages of the present invention will become apparent upon consideration of the following detailed description of one specific embodiment thereof, especially when taken in conjunction with FIG. 3.

DETAILED DESCRIPTION OF A PREFERRED EMBODIMENT

Reference is now made to FIG. 3 of the drawing wherein there is illustrated a circuit diagram of a preferred embodiment of the invention. The amplifier and primary feedback circuits of FIG. 3 are identical with the corresponding circuits of FIG. 1, except that potentiometer 20 and its slider 23 are excluded in FIG. 3 and replaced with a circuit for providing automatic reset and zero control. The automatic control of zero and reset is attained by cascaded operational amplifier stages 81 and 82 which respectively provide controlled gain and integration.

Each of stages 81 and 82 includes a d.c., high gain operational amplifier having inverting and non-inverting inputs, positive and negative d.c. power supply terminals and an offset terminal. Amplifier 84 is preferably an integrated circuit having low bias current requirements (e.g. $10^{-11}$ amperes) as is achieved by using field effect transistors as a first stage, while amplifier 83 can be a typical integrated circuit which draws a bias current on the order of $5 \times 10^{-7}$ amperes. Inverting inputs 85 and 86 of amplifiers 83 and 84 of stages 81 and 82 are connected to d.c. signal sources, while the non-inverting inputs are connected to ground. The non-inverting input of amplifier 83 may be connected directly to ground, but the non-inverting input of amplifier 82 is connected to ground through resistor 87 which provides positive bias current required to attain accurate integration. To compensate for the bias current fed to the non-inverting input of amplifier 82 through resistor 87, a negative current is supplied to the offset circuit thereof through potentiometer 89 from the minus d.c. power supply source for the amplifier via slider 88 of the potentiometer. The position of slider 88 is adjusted, in a manner discussed infra, so that no current is derived at the output terminal of amplifier 84 when no input signal is applied to the operational amplifier circuit 82.

Operational amplifier circuit 81 is, in effect, a variable gain stage having a fixed feedback resistor 91 and a variable input resistor 92. Variable input resistor 92 is connected between cathode 35 and the inverting input terminal 85 of operational amplifier 83. The value of resistor 92 can be set at one of a plurality, such as three, values to provide a plurality of gains for circuit 81. The voltage derived at the output of amplifier 83 is applied to an inexpensive milliammeter 93 through resistor 94. The gains of circuit 81 are selected so that a full scale, one milliampere reading of milliammeter 93 is derived for a 10 volt output of amplifier 83, for the three gain settings mentioned. Gain settings of two, 20 and 200 provide full scale deflection of meter 93 for leak currents of approximately $10^{-9}$ standard cubic centimeters per second, $10^{-10}$ standard cubic centimeters per second and $10^{-11}$ standard cubic centimeters per second.

Under steady state conditions, when no sample is being monitored by mass spectrometer tube 12, the output of circuit 81 is fed to the input of circuit 82 by virtue of switch 95 being closed. Immediately preparatory to monitoring a sample, switch 95 is opened by an operator and remains open until the operator observes that the collector current of spectrometer 11 is no longer responding to the sample, as indicated by meter 93 returning to its reading (zero) prior to introduction of the sample. If automatic testing operations are employed, switch 95 is operated by an automatic sequencing device.

When switch 95 is closed while spectrometer 12 is in steady state operation, the d.c. output current of circuit 81 is integrated by circuit 82 to provide proportional and reset feedback control which automatically maintains a zero reading of meter 93 even if drift occurs. To provide the integration, circuit 82 includes a capacitor 96 in its negative feedback loop and a fixed resistor 97 in its input circuit. A relatively small resistor 98, typically having a value of 10 ohms, is connected in series with capacitor 96 in the negative feedback loop of amplifier 84 to slightly augment portional feedback of the feedback loop including circuits 81 and 82. Under certain circumstances it is desirable to vary the time constant of integrating circuit 82; it is to be understood, however, that varying the integrating time of integrator circuit 82 is not frequently necessary. To provide the variable integration time, variable resistor 99 is connected in series between resistor 97 and inverting input terminal 86 of amplifier 84. Resistor 99 can be completely removed from the circuit by closing switch 100 to short circuit its two terminals together. To provide a voltage level referenced to ground for the input terminal 86 of amplifier 84 during the period while switch 95 is open, resistor 101 is connected in shunt with non-inverting input terminal 86. To monitor the output voltage of integrating circuit 82, a d.c., high impedance voltmeter 104 is connected between the output terminal of amplifier 84 and ground.

To protect amplifier 82 so that its output voltage does not become excessive in either direction, Zener diode 105 shunts the amplifier output terminal. Zener diode 105 provides a relatively low impedance in response to the output voltage of amplifier 84 exceeding predetermined positive and negative limits, such as +10 volts and −0.6 volts. It is, therefore, desirable to operate the circuit so that under steady state conditions the output voltage of amplifier 84 is in the middle of the operating range of Zener diode 105; in the example given, the middle of the range is approximately 5 volts.

The output of intergrating circuit 84 is applied to the screen grid 18 of electrometer tube 13 via a voltage divider comprising resistors 106 and 107. Typically, the voltage divider comprising resistors 106 and 107 attenuates the output voltage of integrating circuit 82 by approximately one-fourth, to reduce the effect of drift in the circuit, without severely reducing the detectable range of helium background variation in the mass spectrometer tube 12.

In operation, switch 95 is opened and slider 88 is adjusted until the output voltage of amplifier 84 is stabilized. Stabilization of the output voltage of amplifier 84 is determined by varying the position of potentiometer 89 until the reading of meter 104 is maintained at a constant value. The constant meter reading can be at any value, and is not predetermined. Next, switch 95 is closed and a coarse zero adjustment is made by varying the value of resistor 21 in the screen grid circuit of electrometer tube 13 until the reading of voltmeter 104 is at a predetermined value in the mid-range of the output of amplifier 84; in the example 5 volts. The coarse zero adjustment is made while spectrometer tube 12 is operating under steady state conditions. As long as the spectrometer remains in steady state operation, switch 95 remains closed and integrating circuit 82 feeds back a voltage to screen grid 18 to compensate for drift of the helium pressure in the spectrometer, electrometer tube and the remainder of the amplifier, as well as to provide automatic zero control, whereby the reading of milliammeter 93 is zero.

Immediately prior to introduction of a sample in the spectrometer tube, switch 95 is opened by the operator or automatic sequencer. With switch 95 opened, integrating circuit 82 continues to feed back to screen grid 18 the same voltage as was fed back while switch 95 was closed, thereby to provide the same drift and automatic zero control as existed while switch 95 was closed. It is necessary to open switch 95 while the sample is providing a response leak current to electrometer tube 13 because the resulting variation at the output of circuit 81 would cause a change in the screen grid bias of tube 13 to nullify the leak current variation. The leak current variation which is derived in response to introduction of the sample is measured by reading meter 93. After meter 93 has returned to its initial zero position, the reading which existed prior to introduction of the sample, or after a predetermined time interval has elapsed after introduction of the sample, switch 95 is closed and the feedback loop for control of the drift and automatic zero is reestablished. Since only approximately three seconds are required to read the leak current that is derived in response to introduction of a sample, the amount of drift while switch 95 is open is negligible and does not adversely affect the operation of the device.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A circuit for indicating leak current derived from a high impedance electrode of an instrument, such as a mass spectrometer, said electrode deriving a relatively constant steady state current that is subject to drift and a transient output current indicative of a transient response, comprising a d.c. amplifier, said amplifier including: a linear d.c. amplifying element having a control electrode and an output electrode, said control electrode having an input impedance approximately on the order of magnitude of the impedance of the instrument electrode, said control electrode being connected in a d.c. circuit with the instrument electrode, a resistor having a value approximately on the order of magnitude of the impedance of the instrument electrode connected directly to the control electrode so that the instrument electrode current develops a sufficient voltage at the control electrode to be amplified to a detectable level at the output electrode, a d.c. negative feedback loop responsive to the voltage at the output electrode for feeding back current to the control electrode through said resistor; circuit means for providing automatic zero and reset control for said amplifier, said circuit means including another d.c. negative feedback loop having an input selectively responsive to the voltage at the output electrode and an output for supplying a feedback voltage to an electrode of the amplifier, said another feedback loop including an integrator, switch means for providing the selective responsiveness of the another feedback loop, means for supplying current to the integrator while the another feedback loop is unresponsive to the voltage at the output electrode so that the integrator continues to supply the same feedback voltage to the electrode while the another feedback loop is unresponsive to the voltage at the output electrode as when the another feedback loop was last responsive to the voltage at the output, and a d.c. meter circuit responsive to the voltage at the output electrode for indicating the collector current.

2. The circuit of claim 1 wherein the output of the another feedback circuit is fed to a further input electrode of the amplifier different from the control electrode, through a d.c. path having a relatively low impedance.

3. The circuit of claim 2 wherein the amplifying element comprises an electrometer tube having a control grid and anode respectively serving as the control and output electrodes, said further electrode being a screen grid of the electrometer tube, and the relatively low d.c. impedance path connecting the output of the another feedback circuit to the screen grid.

4. The circuit of claim 1 wherein the d.c. meter circuit is included in the another d.c. feedback circuit.

5. The circuit of claim 3 further including first and second d.c. cascaded operational amplifiers, the second of said amplifiers being included in said integrator, and means for connecting said meter circuit to be responsive to voltage at an output terminal of said first amplifier, said switch means being connected between the output terminal and an input terminal of said second amplifier.

6. The circuit of claim 4 further including means for varying the gain of the first amplifier.

7. A circuit as claimed in claim 1 wherein said integrator includes a d.c. operational amplifier having a negative feedback path, a series capacitor connected in said negative feedback path, said operational amplifier having an offset terminal, and means for supply a d.c. current to the offset terminal to enable the continued supply of the same feedback voltage to the control electrode.

8. A circuit for indicating current derived from a device, such as a mass spectrometer, having a substantially constant steady state output current that is subject to drift and a transient output leak current indicative of a transient response, said device having a high output impedance, comprising a d.c. amplifier, said amplifier including: a linear d.c. amplifying element having a control electrode and an output electrode, said control electrode having an input impedance approximately on the order of magnitude of the output impedance of the device, said control element being connected in a d.c. circuit to be responsive to the output current of the device, a resistor having a value approximately on the order of magnitude of the output impedance of the device connected directly to the control electrode so that the output current develops a sufficient voltage at the control electrode to be amplified to a detectable level at the output electrode, a d.c. negative feedback loop responsive to the voltage at the output electrode for feeding back current to the control electrode through said resistor, said amplifier including a further input electrode differing from the control electrode; circuit means for providing automatic zero and reset control for said amplifier, said circuit means including another d.c. negative feedback loop having an input selectively responsive to the voltage at the output electrode and an output terminal, means for connecting said output terminal and the further electrode in a relatively low d.c. impedance path to provide a feedback voltage to the further electrode, said another feedback loop including an integrator, switch means for providing the selective responsiveness of the another feedback loop without altering the feedback voltage to the further electrode, and a d.c. meter circuit responsive to the voltage at the output electrode for indicating the collector current.

9. The circuit of claim 8 wherein the amplifying element comprises an electrometer tube having a control grid and anode respectively serving as the control and output electrodes, said further electrode being a screen grid of the electrometer tube, and the relatively low d.c. impedance path connecting the output of the another feedback circuit to the screen grid.

10. A method of indicating current derived from a high impedance collector electrode of an analyzing instrument, such as a mass spectrometer, with a d.c. amplifier responsive to the current, said amplifier including a negative feedback loop for feeding a voltage to the amplifier to provide automatic zero and drift compensation for the instrument and amplifier, said feedback loop including a capacitor supplying the voltage to the amplifier, comprising the steps of connecting the capacitor to be responsive to the amplifier output while the instrument is in a steady state condition, inserting a sample to be anaylzed in the instrument, whereby the collector current has a transient response immediately after introduction of the sample, disconnecting the feedback loop so the capacitor is unresponsive to the transient response without altering the voltage supplied by the capacitor to the amplifier while the transient response is being derived, while the feedback loop is disconnected maintaining the voltage on the capacitor constant, and metering the current derived from the collector while the transient response is being derived.

* * * * *